United States Patent
Bertrand

(10) Patent No.: US 9,172,563 B2
(45) Date of Patent: Oct. 27, 2015

(54) INTEGRATED COMBINER WITH COMMON MODE CORRECTION

(75) Inventor: Keith J. Bertrand, Mountain View, CA (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 13/560,624

(22) Filed: Jul. 27, 2012

(65) Prior Publication Data

US 2013/0194053 A1  Aug. 1, 2013

Related U.S. Application Data

(60) Provisional application No. 61/591,587, filed on Jan. 27, 2012.

(51) Int. Cl.
  *G05F 1/10* (2006.01)
  *H04L 25/02* (2006.01)

(52) U.S. Cl.
  CPC ........ *H04L 25/0274* (2013.01); *H04L 25/0276* (2013.01)

(58) Field of Classification Search
  CPC ............... H01L 2924/0002; H03K 5/2481; H04L 25/0272
  See application file for complete search history.

(56) References Cited

U.S. PATENT DOCUMENTS

| | | | |
|---|---|---|---|
| 6,566,915 B1 * | 5/2003 | Krupnik et al. | 327/58 |
| 7,420,423 B2 * | 9/2008 | Lee et al. | 330/301 |
| 2008/0272842 A1 | 11/2008 | Lee et al. | |
| 2011/0187349 A1 * | 8/2011 | Yamamoto et al. | 324/119 |

FOREIGN PATENT DOCUMENTS

EP  1492287 A1  12/2004

OTHER PUBLICATIONS

Castello, R. et al., "Analog Front-End of an ECBM Transceiver for ISDN", Proceedings of the IEEE 1989 Custom Integrated Circuits Conference, May 15, 1989, pp. 16.4.1-16.4.4, IEEE, New York, USA.

* cited by examiner

*Primary Examiner* — Sibin Chen
(74) *Attorney, Agent, or Firm* — Michael A. Nelson; Andrew J. Harrington; Marger Johnson

(57) ABSTRACT

A circuit can include multiple data input ports and data output ports, pickoff tees coupled therebetween, and a resistive network coupled between the pickoff tees. A differential signal generator can be coupled with the resistive network and the pickoff tees. Resistances of the pickoff tees and resistive network can be selected such that impedances looking into the data input ports and data output ports are matched to a desired system impedance.

17 Claims, 8 Drawing Sheets

INTEGRATED COMBINER WITH COMMON MODE CORRECTION

CROSS-REFERENCE TO RELATED APPLICATION

The present application claims the benefit of U.S. Provisional Patent Application No. 61/591,587, titled "INTEGRATED COMBINER WITH COMMON MODE CORRECTION" and filed on Jan. 27, 2012, the content of which is hereby fully incorporated by reference herein.

TECHNICAL FIELD

Embodiments of the disclosed technology generally relate to test and measurement instruments, and more particularly to circuits for adding common mode and differential mode signals onto broadband differential data. Embodiments generally allow for broad and flat frequency response in common mode signals and low-loss, broadband, and flat frequency response in the data.

BACKGROUND

FIG. 1 is functional diagram illustrating an example of a prior system 100 that includes three resistive combiners 108, 110, and 112 and two directional couplers 114 and 116. In the example, the system 100 includes a first signal generator 102 that provides a differential data signal to the directional couplers 114 and 116. The system 100 also includes a second signal generator 104 that provides an input signal, such as a 2.1 GHz sine wave, to a balun 105. Balun 105 creates a differential mode signal from the single-ended signal it receives from signal generator 104, and provides one end of the differential mode signal to resistive combiner 108 and the other end to resistive combiner 110. The system 100 also includes a common mode (CM) signal generator 106 that provides a CM signal to an amplifier 107 before being passed to resistive combiner 112.

Resistive combiner 112 is electrically coupled between the amplifier 107 and each of the other two resistive combiners 108 and 110, which also receive signals from the balun 105. In this manner the resistive combiners 108, 110, and 112 effectively combine the input signal from the second signal generator 104 with the CM signal from the CM signal generator 106. Directional couplers 114 and 116 effectively apply the differential data from the first signal generator 102 to the resulting signals from resistive combiners 108 and 110, respectively.

Prior implementations such as the one illustrated by FIG. 1 are physically large and expensive. Such implementations also have a number of disadvantages. For example, loss from input data to output data is generally higher at high frequencies than at low frequencies. In other words, such loss is not flat aver frequency. Also, loss from other inputs to output data tends to roll off as frequency decreases and can be inadequate at certain frequencies, some of which can be important.

FIG. 2 is a functional diagram illustrating an example of a prior apparatus 200 that includes five resistive combiners 202 and 206-212, balun 204, and no directional couplers. In the example, resistive combiner 202 may receive the common mode (CM) input and balun 204 may receive the differential mode (DM) input. Resistive combiners 206 and 208 are each electrically coupled with resistive combiner 202 and balun 204 and also with resistive combiners 210 and 212, respectively. Resistive combiners 210 and 212 are typically pickoff tees.

Prior systems such as would use the apparatus of FIG. 2 generally use resistive combining, e.g., pickoff tees 210 and 212, for a flatter loss in input data to output data aver frequency. Such systems have loss in the input data to output data path that is relatively low (2 dB). However, a consequence is that a pickoff tee that injects the differential mode and common mode signals onto the data generally has higher impedance at the injection point than the system impedance of 50 Ohms, thereby causing reflections that lead to a non-flat transfer function from the CM input and DM input to the data output.

Another disadvantage of prior approaches is that, in order to avoid further impedance mismatches, the balun that the DM input signal goes into, e.g., balun 204 of FIG. 2, must have a 2:1 turn ratio, which limits its frequency response relative to what is achievable with transmission line baluns having a 1:1 ratio.

FIG. 3 is a functional diagram illustrating an example of a prior system 300 that includes four resistive combiners 310-316 that effectively combine a DM signal from a DM source 302 and CM signal from two separate CM sources 306 and 308 with an input signal from a pattern generator 304. As with the apparatus 200 of FIG. 2, this system 300 also uses resistive combining for flat loss in the input data to output data over frequency. The system 300 also has the disadvantage of high through loss, i.e., 6 dB, from the input data to the output data. It also cannot receive as input a single-ended differential mode input but instead requires two signals that are 180 degrees out of phase and each have 50 Ohm impedance.

FIG. 4 is a graphing that illustrates an example 400 of a data signal resulting from a prior system or apparatus such as that illustrated by FIG. 1. One having ordinary skill in the art will appreciate that the attenuation over frequency in the example 400 is not flat, thus resulting in a data signal that is not clean.

Accordingly, a need remains for improved systems that add CM and DM signals onto differential data.

SUMMARY

A combining circuit in accordance with the disclosed technology may include a resistive combiner configured to receive a differential mode (DM) signal from a DM input and a common mode (CM) correction signal from a CM correction input, a balun electrically coupled between the resistive combiner and a second resistive combiner configured to receive a CM signal from a CM input. The balun and second resistive combiner may be electrically coupled between multiple input data ports and output data ports. Pickoff tees may be used to electrically couple the balun and the second resistive combiner with the input data ports and output data ports.

DETAILED DESCRIPTION

Embodiments of the disclosed technology generally include reduced size resistive networks, such as would be suitable to be implemented in any of a number of different circuits and systems. These and other features and embodiments of the present invention proceed with reference to each of the figures.

Figure 5:
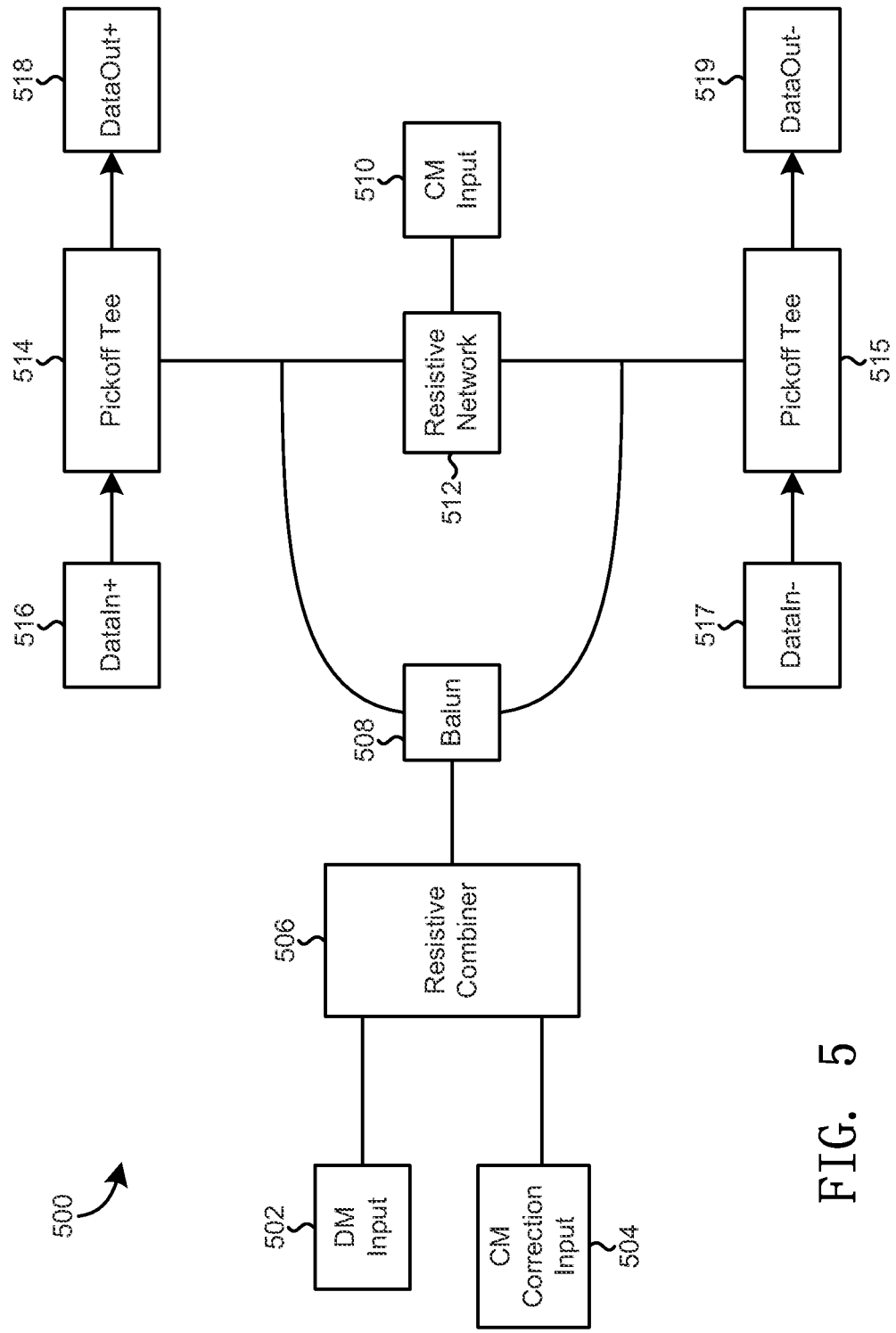
FIG. 5 is a functional diagram illustrating an example of a system in accordance with certain embodiments of the disclosed technology.

FIG. 5 is a functional diagram illustrating an example of a system 500 in accordance with certain embodiments of the disclosed technology. In the example, differential data may be received from DataIn+ and DataIn− ports 516 and 517, respectively, and delivered to DataOut+ and DataOut− ports 518 and 519, respectively with a small amount of loss.

A single-ended signal from a differential mode (DM) input 502 may be resistively combined with a signal from a common mode (CM) correction input 504 by a resistive combiner 506 and then split into differential mode signal by a balun 508. The balun 508 may be a 1:1 ratio transmission line balun, for example.

The resulting signal from the balun 508 may then be applied to the output data ports DataOut+ 518 and DataOut− 519 by way of two pickoff tees 514 and 515, respectively. The signal may be applied with equal amplitude but 180 degrees out of phase.

A signal from a CM input 510 may be applied to the output data ports DataOut+ 518 and DataOut− 519 by way of a resistive network 512 and the pickoff tees 514 and 515, respectively. The signal may be applied with equal amplitude and in phase.

The signal received from the CM correction input 504 may be applied to the output data ports DataOut+ 518 and DataOut− 519 with equal amplitude but 180 degrees out of phase. In situations where this signal is applied at the same frequency as the signal applied by the CM input 510, its amplitude and phase may be adjusted in order to cancel out any DM signal that is inadvertently caused by the signal applied by the CM input 510.

In certain embodiments, various components used to implement the system 500 may be integrated, on a single circuit board and, consequently, they may be kept in close proximity to each other. In such embodiments, some or all of the ports may advantageously maintain a certain impedance, e.g., 50 Ohms, over a broad frequency range.

Figure 6:
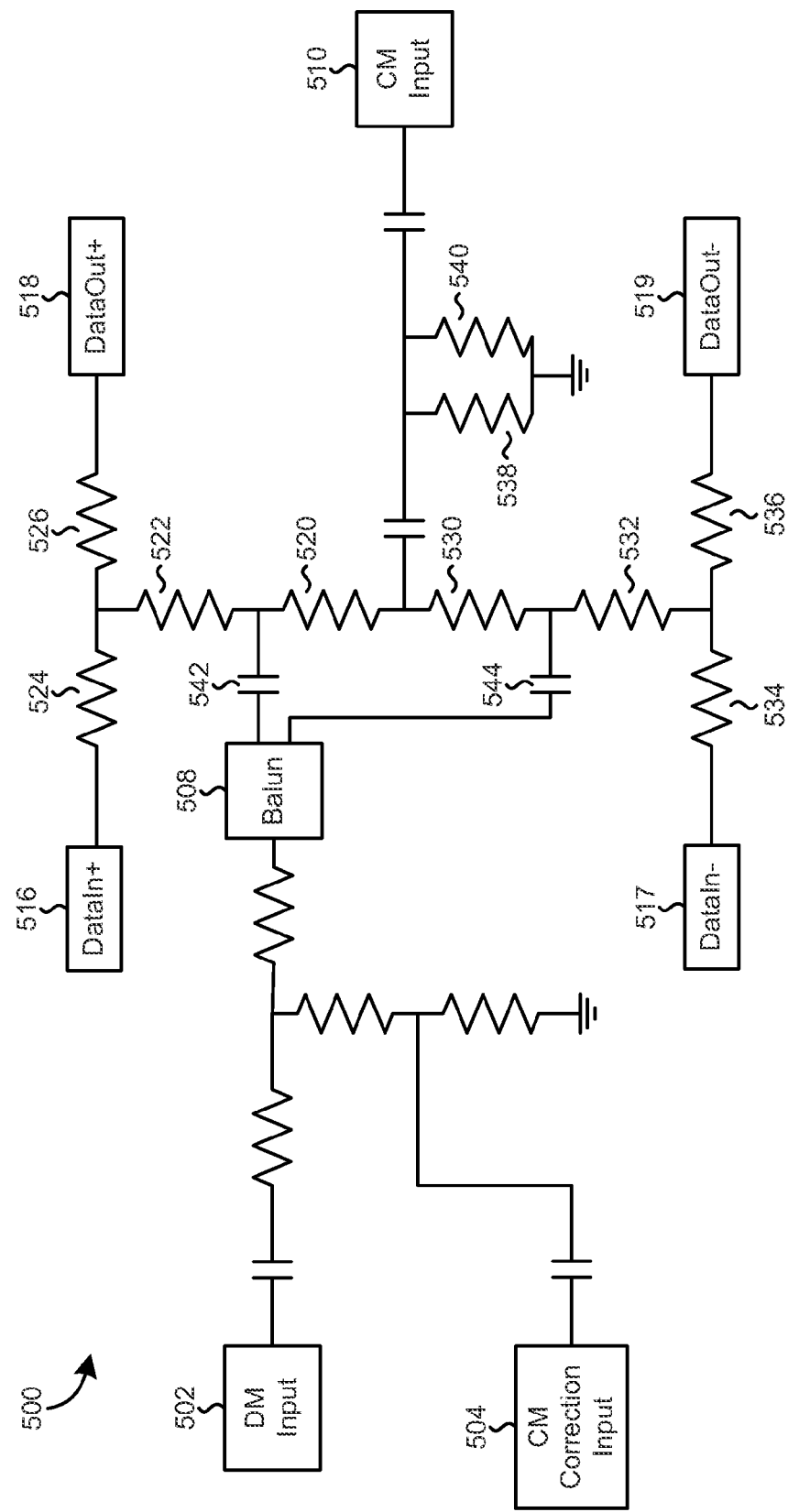
FIG. 6 is a circuit diagram illustrating a more detailed view of the system illustrated by FIG. 5 in accordance with certain embodiments of the disclosed technology.

FIG. 6 is a circuit diagram illustrating a more detailed view of the system 500 illustrated by FIG. 5 in accordance with certain embodiments of the disclosed technology. In the example, the DM input 502 is terminated by resistor 520 in series with resistor 530, in parallel with the resistances to the DataIn+/− and DataOut+/− ports, i.e., resistors 522 and 524 to the DataIn+ port 516, resistors 532 and 534 to the DataIn− port 517, resistors 522 and 526 to the DataOut+ port 518, and resistors 532 and 536 to the DataOut− port 519.

Because the CM input 510 is at a point around which the DM input 502 signal swings symmetrically, there is essentially no current flow from the DM input 502 to the CM input 510. This is also the case for the CM correction input 504.

In the example, the CM input 510 is terminated by resistor 538 in parallel with resistor 540, in parallel with the resistances to the DataIn+/− and DataOut+/− ports, i.e., resistors 522 and 524 to the DataIn+ port 516, resistors 532 and 534 to the DataIn− port 517, resistors 522 and 526 to the DataOut+ port 518, and resistors 532 and 536 to the DataOut− port 519. Current from the CM input 510 is limited from flowing out the DM input 502 and CM correction input 504 at low frequencies by capacitors 542 and 544 and, at high frequencies by the common mode rejection of balun 508.

In the example, resistors 520-526 and a 25 Ohm impedance into balun 508 effectively form a 50 Ohm impedance-matched T attenuator between the DataIn+ port 516 and, the DataOut+ port 518. The attenuation of this T attenuator may be 1.5 dB, for example. Similarly, resistors 530-536 and the 25 Ohm impedance into balun 508 effectively form a 50 Ohm impedance-matched T attenuator between the DataIn− port 517 and the DataOut− port 519. The attenuation of this T attenuator may also be 1.5 dB, for example.

Combining the differential mode signals, e.g., from the DM input 502 and CM input 510, with the CM correction input signal, e.g., from the CM correction input 504, before applying them to the DataIn+/− and DataOut+/− ports in accordance with the disclosed technology advantageously results in minimal signal loss. This allows a designer to have higher loss when applying the combined signals to DataOut+/−, which in turn results in lower loss in the path from the DataIn+/− ports 516 and 517 to the DataOut+/− ports 518 and 519.

Resistor values of a circuit in accordance with the disclosed technology may be modified to change the tradeoff between the attenuation from the DataIn+/− ports 516 and 517 to the DataOut+/− ports and the transfer function from the other three inputs to the DataIn+/− ports 516 and 517 and DataOut+/− ports 518 and 519 while still maintaining an impedance of 50 Ohms at all of the ports 502, 504, 510, and 516-519 over a broad frequency range.

Figure 1:
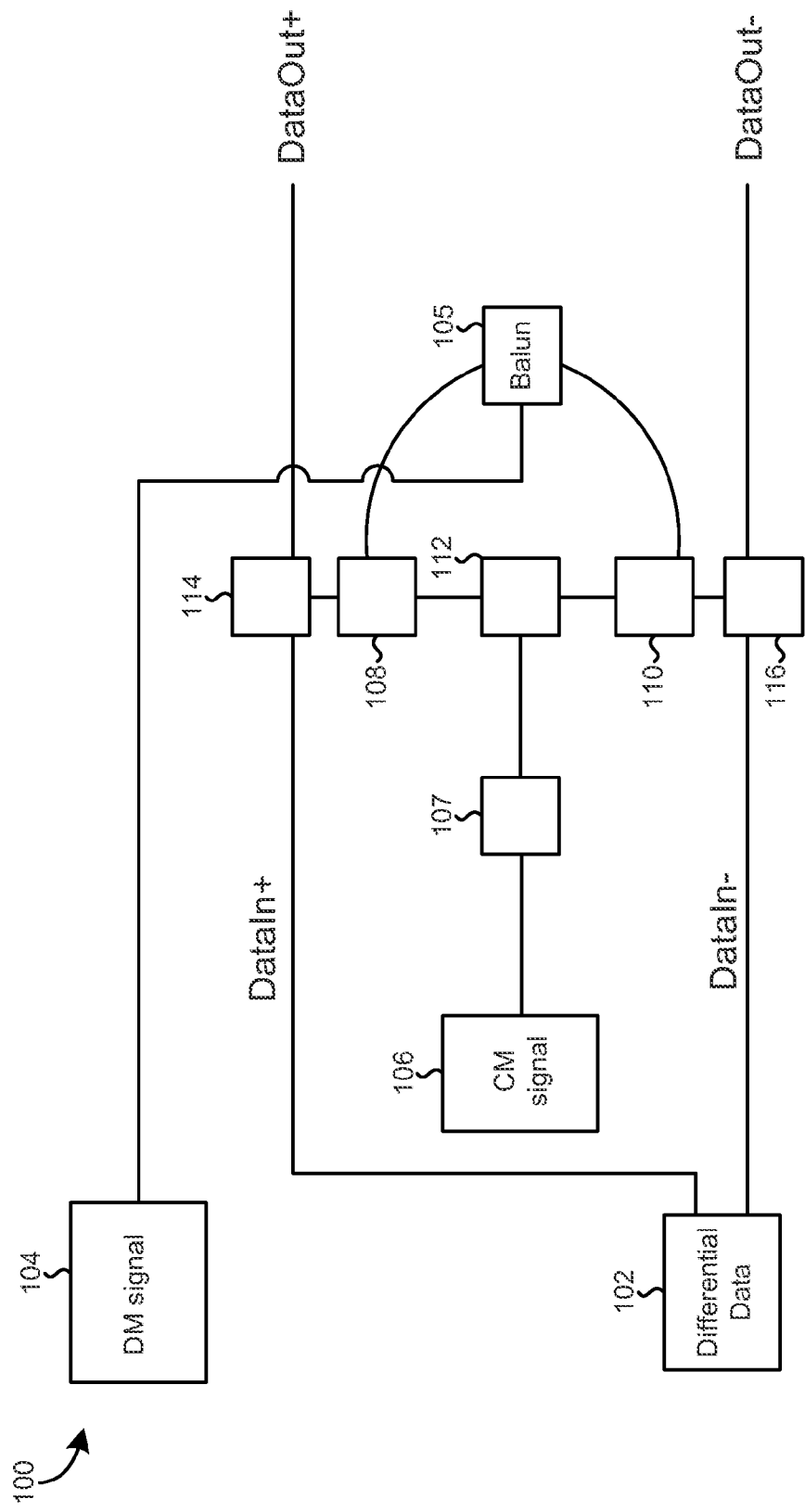
FIG. 1 is functional diagram illustrating an example of a prior system that includes three resistive combiners, a balun, and two directional couplers.
Figure 2:
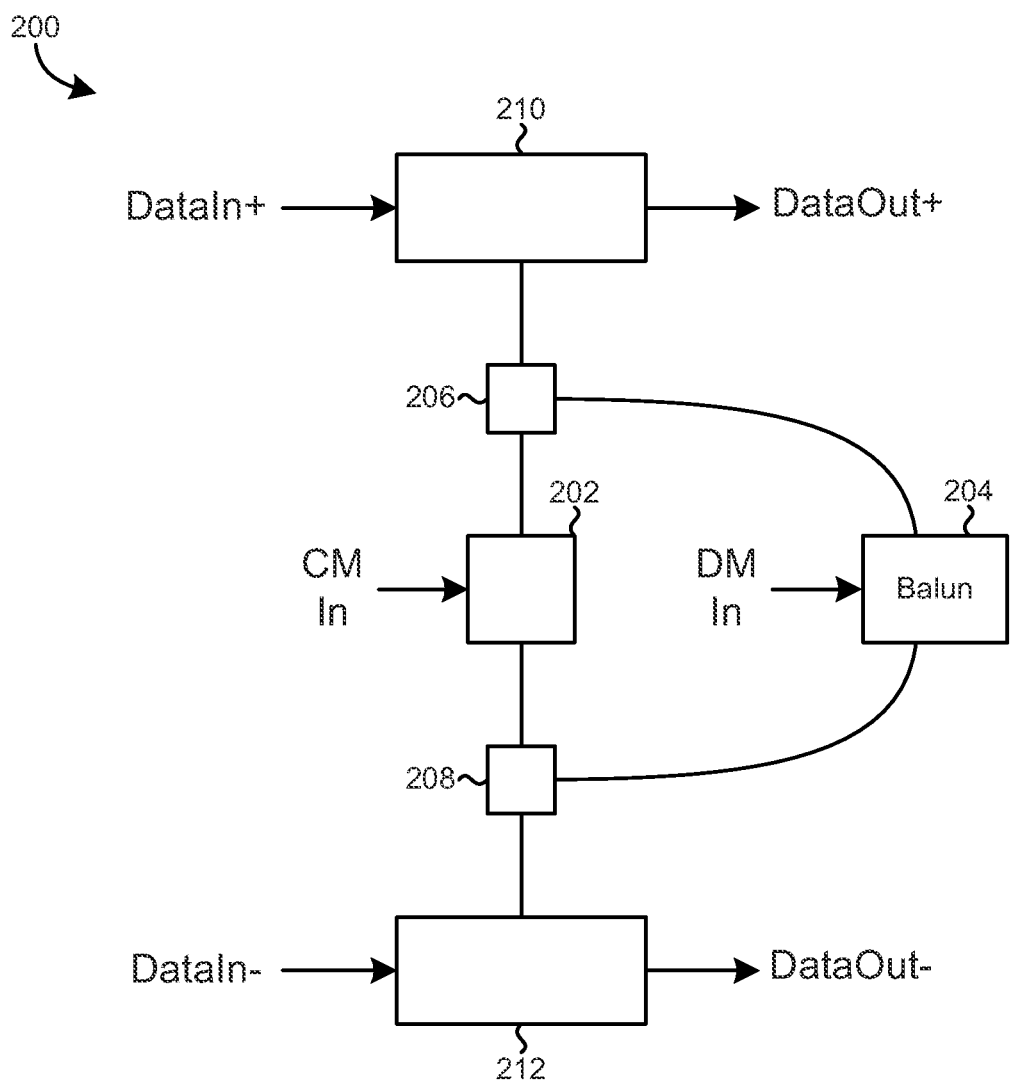
FIG. 2 is a functional diagram illustrating an example of a prior apparatus that includes five resistive combiners, a balun, and no directional couplers.
Figure 3:
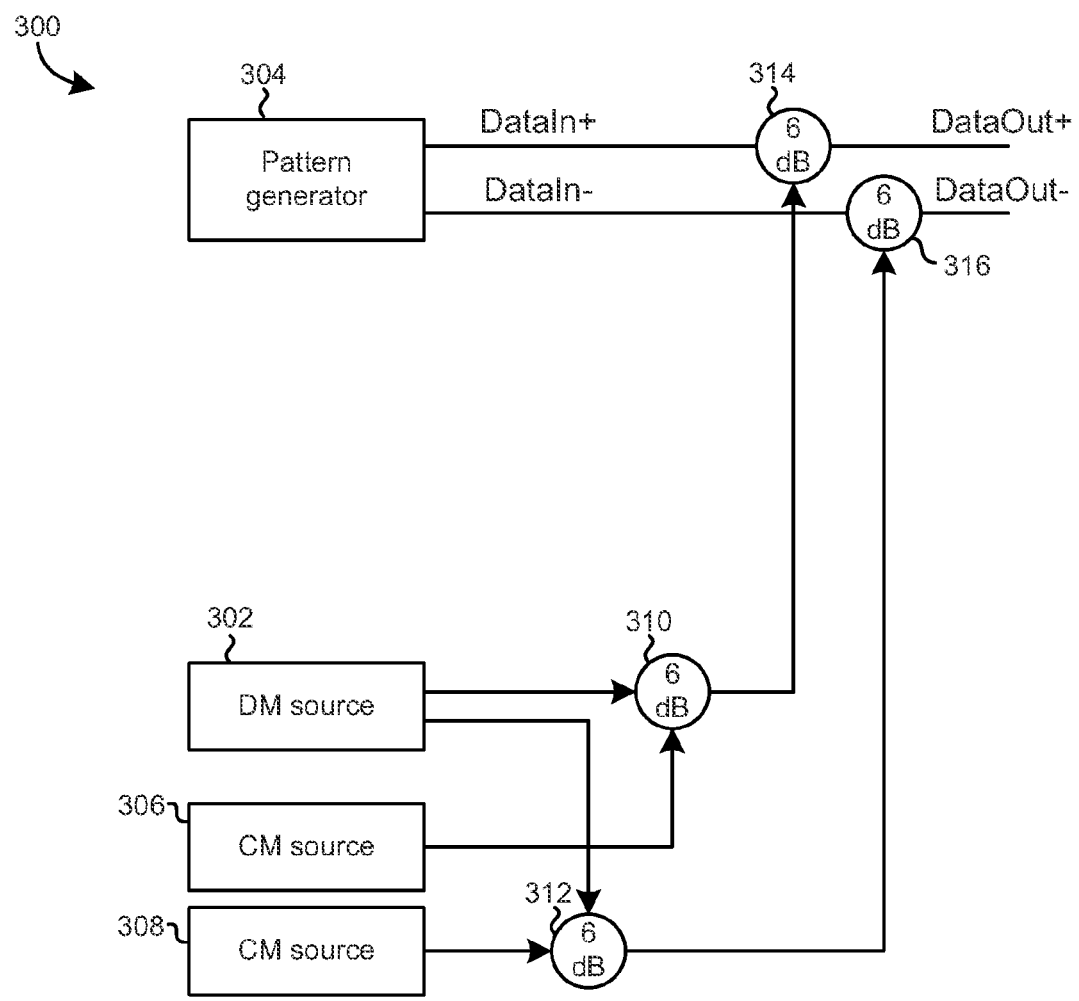
FIG. 3 is a functional diagram illustrating an example of a prior system 300 that includes four resistive combiners and no directional couplers.
Figure 4:
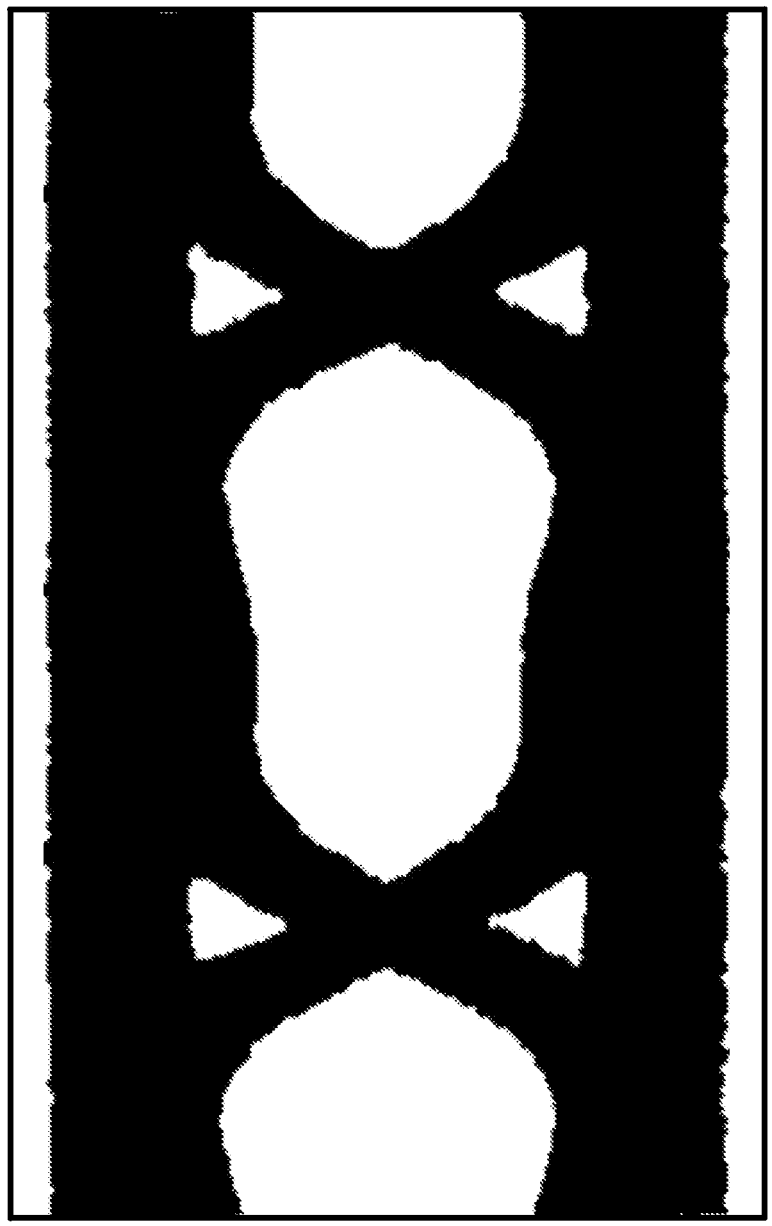
FIG. 4 is a graphing that illustrates an example of a data signal resulting from a prior system or apparatus such as that illustrated by FIG. 1.
Figure 7:
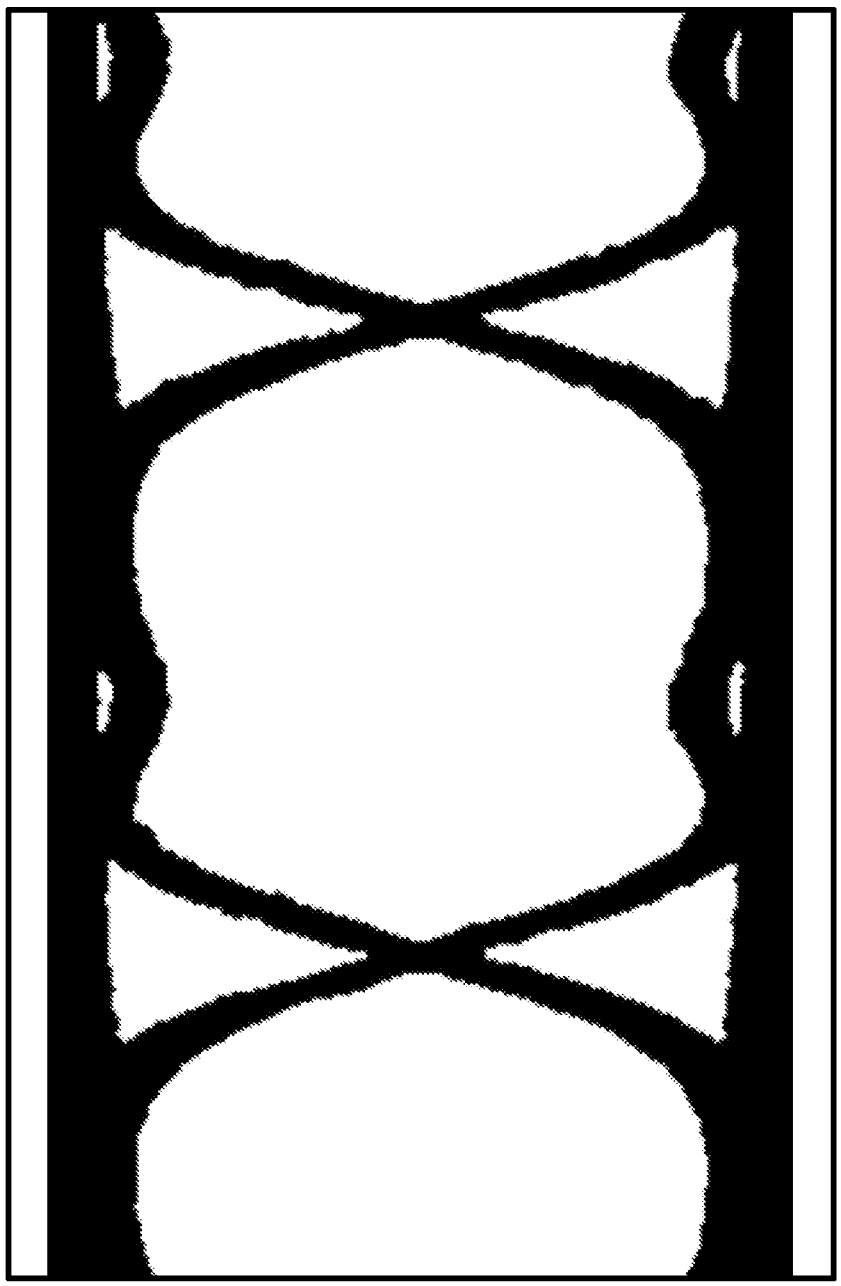
FIG. 7 is a graphing that illustrates an example of a data signal resulting from an implementation in accordance with the disclosed technology, such as that illustrated by FIGS. 5 and 6.

FIG. 7 is a graphing that illustrates an example 700 of a data signal resulting from an implementation in accordance with the disclosed technology, such as that illustrated by FIGS. 5 and 6. One having ordinary skill in the art will appreciate that the attenuation over frequency is flatter than would be for prior implementations that use a directional coupler, thus resulting in a cleaner data signal as can be readily seen in the illustrated example 700, e.g., vis-à-vis the example 400 of FIG. 4.

Figure 8:
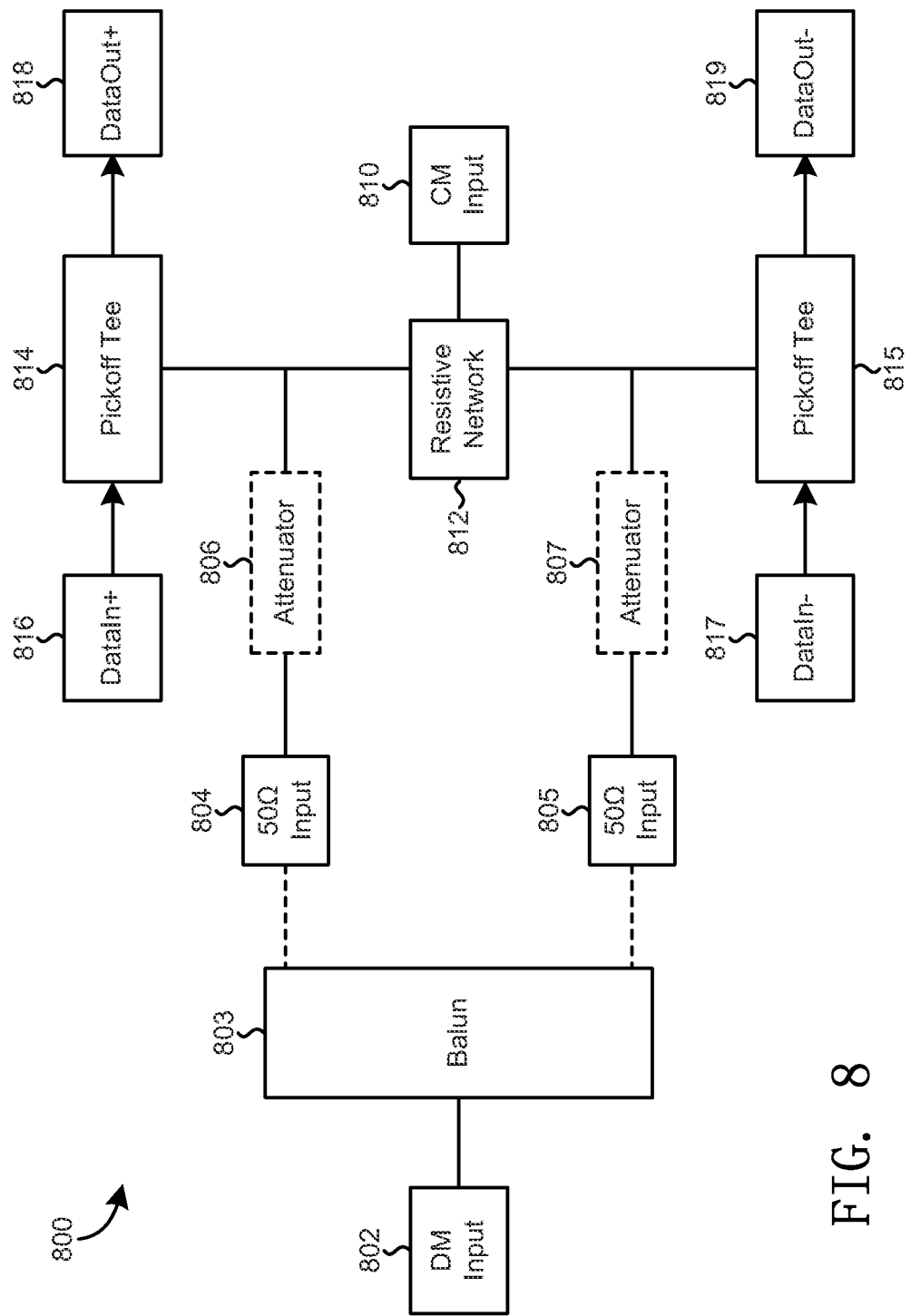
FIG. 8 is a functional diagram illustrating another example of a system in accordance with certain embodiments of the disclosed technology.

FIG. 8 is a functional diagram illustrating another example of a system 800 in accordance with certain embodiments of the disclosed technology. In the example, the system 800 includes DataIn+/− ports 816 and 817, DataOut+/− ports 818 and 819, and a CM input 810. The system 800 also includes a DM input 802 that provides an input signal to a balun 803, which converts the signal from single-ended to differential. In the example, a resistive network 812 is electrically coupled between the CM input 810 and two pickoff tees 814 and 815. Implementation of the pickoff tees 814 and 815 may be substantially the same as that of the pickoff tees 514 and 515 of FIGS. 5 and 6, for example.

In the example, the balun 803 is not on the same circuit board as the other components of the combiner circuitry; rather, two legs of the differential mode signal are provided on two separate 50 Ohm inputs 804 and 805. Attenuators 806 and 807, e.g., separate 6 dB attenuators, may be used on the legs of the signal to minimize the effects of any potentially undesirable reflections. In alternative embodiments, a differential amplifier may be used in place of the balun 803.

While a CM correction signal is not shown in the illustrated system 800, the signal may be summed with the DM input 802 before being applied to the balun 803 as is done by the system 500 of FIGS. 5 and 6.

Having described and illustrated the principles of the invention with reference to illustrated embodiments, it will be recognized that the illustrated embodiments may be modified in arrangement and detail without departing from such principles, and may be combined any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A circuit, comprising:
a first data input port;
a first data output port;
a second data input port;
a second data output port;
a first pickoff tee coupled between the first data input port and the first data output port such that the first data output port is connected to a through output of the first pickoff tee;
a second pickoff tee coupled between the second data input port and the second data output port such that the second data output port is connected to a through output of the second pickoff tee;
a resistive network coupled between a pickoff output of the first pickoff tee and a pickoff output of the second pickoff tee; and
a balun coupled with the resistive network, the pickoff output of the first pickoff tee, and the pickoff output of the second pickoff tee,
wherein the first pickoff tee and the second pickoff tee each comprise a passive resistive combiner.

2. The circuit of claim 1, wherein the resistive network is configured to receive a common mode (CM) signal from a CM input.

3. The circuit of claim 2, wherein an impedance seen by the CM input looking into the resistive network is matched to a desired system impedance.

4. The circuit of claim 1, wherein the first pickoff tee further comprises:
a first resistor coupled with the first data input port;
a second resistor coupled with the first data output port and also with the first resistor; and
a third resistor coupled with both the first resistor and the second resistor and also with the resistive network.

5. The circuit of claim 1, wherein the second pickoff tee further comprises:
a first resistor coupled with the second data input port;
a second resistor coupled with the second data output port and also with the first resistor; and
a third resistor coupled with both the first resistor and the second resistor and also with the resistive network.

6. The circuit of claim 1, further comprising at least one capacitor coupled between the balun and the resistive network.

7. The circuit of claim 1, wherein the resistive network comprises:
a first resistor coupled with the pickoff output of the first pickoff tee; and
a second resistor coupled between the first resistor and the pickoff output of the second pickoff tee.

8. The circuit of claim 1, wherein resistances of the first pickoff tee, second pickoff tee, and resistive network are selected such that impedances looking into the first data input port, first data output port, second data input port, and second data output port are matched to a desired system impedance.

9. The circuit of claim 1, wherein an impedance seen by the balun looking into the rest of the circuit is matched to a desired system impedance.

10. A system, comprising:
a differential mode (DM) input configured to provide a DM signal;
a common mode (CM) input configured to provide a CM signal;
a plurality of input data ports;
a plurality of output data ports; and
a circuit comprising:
a first pickoff tee coupled between a first one of the data input ports and a first one of the data output ports such that the first one of the data output ports is connected to a through output of the first pickoff tee;
a second pickoff tee coupled between a second one of the data input ports and a second one of the data output ports such that the second one of the data output ports is connected to a through output of the second pickoff tee;
a resistive network coupled between a pickoff output of the first pickoff tee and a pickoff output of the second pickoff tee; and
a balun coupled with the resistive network, the pickoff output of the first pickoff tee, and the pickoff output of the second pickoff tee,
wherein the first pickoff tee and the second pickoff tee each comprise a passive resistive combiner.

11. The system of claim 10, wherein the first and second pickoff tees and resistive network are mounted on a circuit board and the balun is not mounted on the circuit board.

12. A circuit, comprising:
a first data input port;
a first data output port;
a second data input port;
a second data output port;
a first pickoff tee coupled between the first data input port and the first data output port such that the first data output port is connected to a first through node of the first pickoff tee;
a second pickoff tee coupled between the second data input port and the second data output port such that the second data output port is connected to a second through node of the second pickoff tee;
a resistive network coupled between a first pickoff node of the first pickoff tee and a second pickoff node of the second pickoff tee;
a balun coupled with the resistive network, the first pickoff node of the first pickoff tee, and the second pickoff node of the second pickoff tee; and a resistive combiner configured to receive a differential signal from a differential mode (DM) input and a common mode (CM) correction signal from a CM correction input.

13. The circuit of claim 12, wherein the balun is configured to receive a combined signal from the resistive combiner.

14. The circuit of claim 13, further comprising at least one attenuator connected between the balun and the resistive network.

15. The circuit of claim 14, wherein the at least one attenuator comprises a 6 dB attenuator.

16. The circuit of claim 12, wherein the resistive combiner and the resistive network are mounted on a circuit board.

17. The circuit of claim 16, wherein the balun is not mounted on the circuit board.

* * * * *